(12) United States Patent
Kogai et al.

(10) Patent No.: US 12,513,375 B2
(45) Date of Patent: Dec. 30, 2025

(54) IMAGE PICKUP APPARATUS USED FOR THERMAL SENSATION PRESENTATION APPARATUS, CONTROL METHOD THEREFOR, AND STORAGE MEDIUM

(71) Applicant: CANON KABUSHIKI KAISHA, Tokyo (JP)

(72) Inventors: Yukihiro Kogai, Kanagawa (JP); Takahiro Usami, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/734,025

(22) Filed: Jun. 5, 2024

(65) Prior Publication Data

US 2024/0430545 A1 Dec. 26, 2024

(30) Foreign Application Priority Data

Jun. 26, 2023 (JP) ................. 2023-104103

(51) Int. Cl.
*H04N 23/11* (2023.01)
*G01J 5/00* (2022.01)
(Continued)

(52) U.S. Cl.
CPC ............ *H04N 23/11* (2023.01); *G01J 5/0025* (2013.01); *G06T 7/20* (2013.01); *G06T 7/62* (2017.01);
(Continued)

(58) Field of Classification Search
CPC ........ H04N 23/11; H04N 23/45; H04N 23/10; H04N 23/61; H04N 23/611;
(Continued)

(56) References Cited

U.S. PATENT DOCUMENTS 11,624,660 B1 * 4/2023 Russo ................ G06V 30/274
348/144
2022/0189023 A1 * 6/2022 Matta ....................... H04N 7/18
(Continued)

FOREIGN PATENT DOCUMENTS

JP 6819670 B2 1/2021

OTHER PUBLICATIONS

Kumiko Kushiyama, Yukiteru Doi, Shinji Sasada, Tetsuaki Baba, "Thermo Drawing: Development of a Thermal drawing system using portable tactile interactive thermal display", The Information Processing Society of Japan, Interaction 2012, Mar. 16, 2012, p. 723-728.

*Primary Examiner* — Boubacar Abdou Tchoussou
(74) *Attorney, Agent, or Firm* — Cowan, Liebowitz & Latman, P.C.

(57) ABSTRACT

An image pickup apparatus capable of recording temperature information on a subject appropriately narrowed down as a target. The image pickup apparatus acquires a visible light image and an invisible light image, acquires a detection result(s) by detecting a subject(s) on a basis of the visible light image, acquires an identification result(s) by identifying, on a basis of the visible light image, type(s) of the detected subject(s), determines whether to record temperature information of a subject on a basis of the detection result and the identification result, wherein in a case where it is determined to record the temperature information of a subject, the temperature information of the subject as a determination target in the determination is acquired on a basis of the invisible light image and the detection result, to record the acquired temperature information on a recording medium.

18 Claims, 12 Drawing Sheets

(51) Int. Cl.
  *G06T 7/20* (2017.01)
  *G06T 7/62* (2017.01)
  *H04N 23/611* (2023.01)
  *H04N 23/62* (2023.01)
  *H04N 23/63* (2023.01)

(52) U.S. Cl.
  CPC ........... *H04N 23/611* (2023.01); *H04N 23/62* (2023.01); *H04N 23/63* (2023.01); *G01J 2005/0077* (2013.01); *G06T 2207/10048* (2013.01); *G06T 2207/20101* (2013.01); *G06T 2207/30196* (2013.01)

(58) Field of Classification Search
  CPC . G06T 2207/30196; G06T 2207/10048; G01J 5/0025; G01J 2005/0077
  See application file for complete search history.

(56) References Cited

U.S. PATENT DOCUMENTS

2023/0043342 A1* 2/2023 Tremblay ............. H04N 23/698
2024/0219241 A1* 7/2024 Choi ........................ G01J 5/60

* cited by examiner

*FIG. 4*

|  | SCENE 1 | SCENE 2 | SCENE 3 | SCENE 4 | SCENE 5 |
|---|---|---|---|---|---|
| DETECTION RESULT | × | ○ | ○ | ○ | ○ |
| IDENTIFICATION RESULT | – | NONE | PERSON | MOTORCYCLE | DOG |
| DETERMINATION RESULT | – | × | ○ | × | ○ |

IMAGE PICKUP APPARATUS USED FOR THERMAL SENSATION PRESENTATION APPARATUS, CONTROL METHOD THEREFOR, AND STORAGE MEDIUM

BACKGROUND OF THE INVENTION

Field of the Invention

The present invention relates to an image pickup apparatus used for a thermal sensation presentation apparatus, a control method therefor, and a storage medium.

Description of the Related Art

In recent years, image pickup apparatuses capable of simultaneously acquiring visible light and invisible light have been developed. For example, Japanese Patent No. 6819670 discloses a technique of, based on the type of a subject, acquiring subject information not shown in a visible light image and performing an effect process on an image. In addition, in recent years, a thermal sensation presentation apparatus capable of allowing a user to enjoy a photograph not only as a visual sensation but also as a tactile sensation or a thermal sensation has appeared.

As such a thermal sensation presentation apparatus, for example, there is a technique of Literature [1] (Kumiko Kushiyama, Yukiteru Doi, Shinji Sasada, Tetsuaki Baba, "Thermo Drawing: Development of a Thermal drawing system using portable tactile interactive thermal display", The Information Processing Society of Japan, Interaction 2012 Mar. 16, 2012, p. 723-728). Literature [1] discloses a display in which Peltier elements capable of switching between cooling and heating are arranged for each area in a matrix shape, and which is capable of displaying an image. The display described in Literature [1] can express temperature by cooling and/or heating the display by controlling each Peltier element in a state where an image is displayed. As a result, a user using the display can feel cool and warm by touching the display, that is, the thermal sensation is presented to the user.

The presentation of the thermal sensation in the thermal sensation presentation apparatus may be performed based on subject information acquired and recorded from visible light by the image pickup apparatus and temperature information acquired and recorded from invisible light by the image pickup apparatus. In such case, when the thermal sensation presentation apparatus limits the subject which presents the thermal sensation, the temperature information acquired and recorded without the image pickup apparatus being controlled may be redundant information for the thermal sensation presentation apparatus. Therefore, the thermal sensation presentation apparatus has a problem that high-specification post-processing such as detection necessary for limiting the subject is required.

SUMMARY OF THE INVENTION

The present invention provides an image pickup apparatus, a control method therefor, and a storage medium capable of recording temperature information on a subject appropriately narrowed down as a target.

Accordingly, the present invention provides an image pickup apparatus comprising one or more controllers configured to function as a first image pickup unit configured to acquire a visible light image, a second image pickup unit configured to acquire an invisible light image, a detection unit configured to acquire one or more detection results by detecting one or more subjects on a basis of the visible light image, an identification unit configured to acquire one or more identification results by identifying, on a basis of the visible light image, types of the one or more subjects detected by the detection unit, a recording determination unit configured to perform recording determination for determining whether or not to record temperature information of the subject on a basis of the detection result and the identification result, and an acquisition and recording unit configured to, in a case where the recording determination unit determines to record the temperature information of the subject, acquire the temperature information of the subject that is a determination target in the recording determination on a basis of the invisible light image and the detection result, and record the acquired temperature information on a recording medium.

According to the present invention, it is possible to record temperature information on a subject appropriately narrowed down as a target.

Further features of the present invention will become apparent from the following description of exemplary embodiments with reference to the attached drawings.

BRIEF DESCRIPTION OF THE DRAWINGS

FIG. 4 is a diagram showing a table in which a detection result by an object detection unit, an identification result by an object identification unit, and a determination result by a temperature recording determination unit are associated with five scenes assumed in the first embodiment.

DESCRIPTION OF THE EMBODIMENTS

The present invention will now be described in detail below with reference to the accompanying drawings showing embodiments thereof.

However, the configurations described in the following embodiments are merely examples, and the scope of the present invention is not limited by the configurations described in the embodiments. For example, each unit constituting the present invention can be replaced with a unit having any configuration capable of exhibiting similar functions. In addition, any component may be added. Also, any two or more configurations (features) of the embodiments can be combined.

An image pickup apparatus according to each embodiment of the present invention acquires temperature information of a subject, and records the acquired temperature information of the subject in association with image information indicating a center position and area in an image of the subject. The temperature information and the image information of the subject acquired and recorded in this way can be used as control data for a thermal sensation presentation apparatus to present the thermal sensation of the subject on a displayed image or the like. It should be noted that the thermal sensation presentation apparatus may receive the temperature information and the image information of the subject acquired and recorded by the image pickup apparatus via a recording medium or via communication with the image pickup apparatus. Hereinafter, first, an image pickup apparatus will be described in each embodiment, and next, a thermal sensation presentation apparatus will be described.

Figure 1:
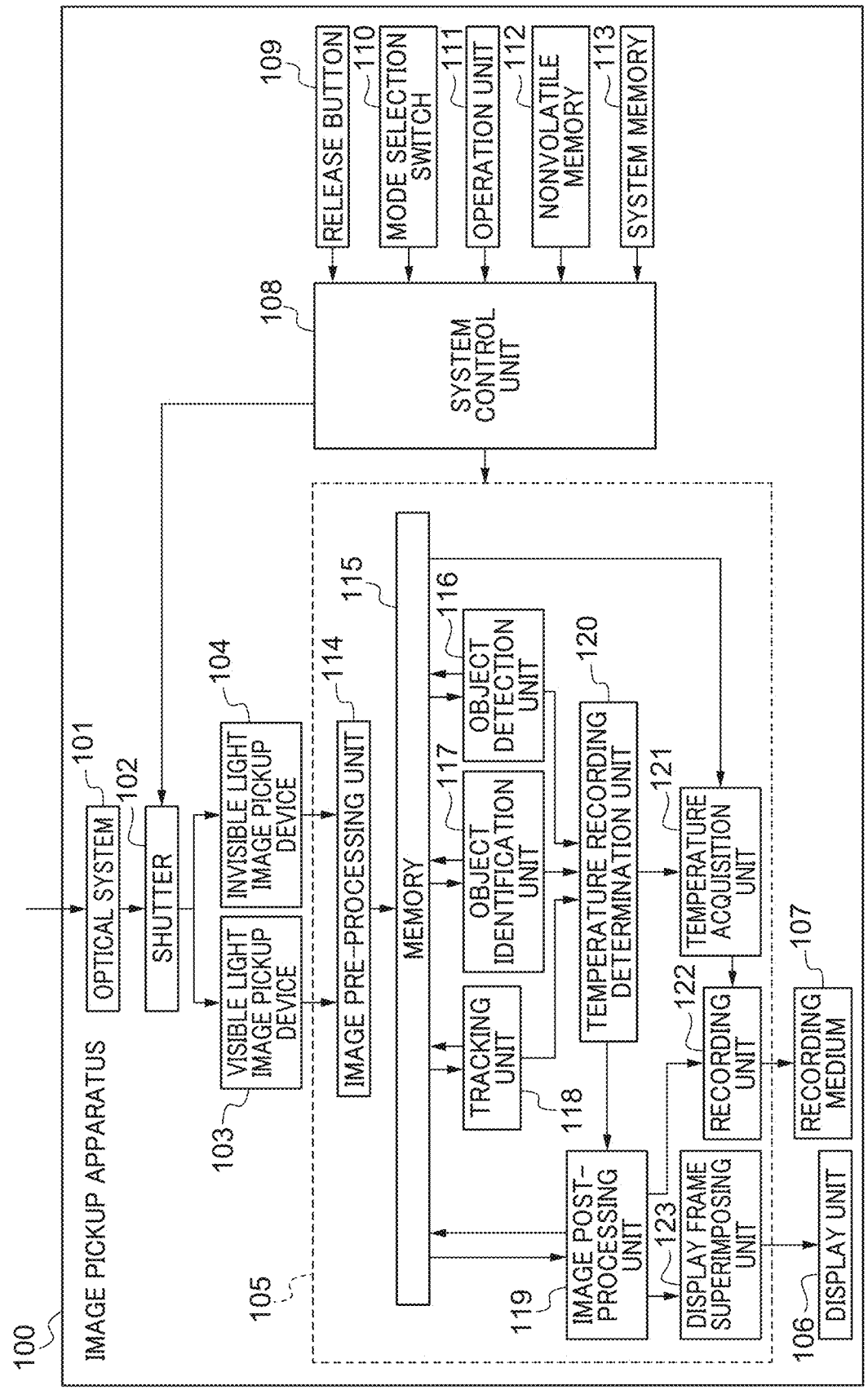
FIG. 1 is a block diagram showing a configuration of an image pickup apparatus according to a first embodiment.

Hereinafter, a first embodiment will be described with reference to FIGS. 1 to 4. FIG. 1 is a block diagram illustrating a configuration of an image pickup apparatus 100 according to the first embodiment. The image pickup apparatus 100 includes an optical system 101, a shutter 102, a visible light image pickup device 103 and an invisible light image pickup device 104 as image pickup units, an image processing unit 105, a display unit 106, a recording medium 107, a system control unit 108, a release button 109, a mode selection switch 110, an operation unit 111, a nonvolatile memory 112, and a system memory 113. In addition, the image processing unit 105 includes an image pre-processing unit 114, a memory 115, an object detection unit 116, an object identification unit 117, a tracking unit 118, an image post-processing unit 119, a temperature recording determination unit 120, a temperature acquisition unit 121, a recording unit 122, and a display frame superimposing unit 123.

The optical system 101 forms images of visible light and invisible light from a subject on the visible light image pickup device 103 and the invisible light image pickup device 104, respectively. The optical system 101 is configured of, for example, a plurality of lenses, a diaphragm, and the like, and zoom control, focus control, diaphragm control, and the like are performed on the optical system 101 by a drive device (not illustrated). The shutter 102 adjusts the exposure time of the visible light image pickup device 103 and the invisible light image pickup device 104 by the shutter speed of the shutter 102 being controlled by the system control unit 108.

The visible light image pickup device 103 (first image pickup unit) converts the visible light incident and imaged via the optical system 101 into an electrical signal to acquire a digital image, and outputs the acquired digital image to the image pre-processing unit 114 of the image processing unit 105. The visible light image pickup device 103 is implemented by using, for example, a complementary metal oxide semiconductor (CMOS) image sensor. The CMOS image sensor includes, for example, a color filter of an RGB Bayer array. It should be noted that in the following description, the digital image acquired from visible light is referred to as a "visible light image".

The invisible light image pickup device 104 (second image pickup unit) converts the invisible light incident and imaged via the optical system 101 into an electrical signal to acquire a digital image, and outputs the acquired digital image to the image pre-processing unit 114 of the image processing unit 105. The invisible light image pickup device 104 is implemented by using, for example, a CMOS image sensor having a color filter that transmits a wavelength region of near-infrared light. It should be noted that in the following description, the digital image acquired from invisible light is referred to as an "invisible light image". In the first embodiment, the visible light image pickup device 103 and the invisible light image pickup device 104 share the optical system 101 and the shutter 102; however, the optical system and the shutter for the visible light image pickup device 103 and the optical system and the shutter for the invisible light image pickup device 104 may be provided independently from each other.

The image processing unit 105 performs, for example, image processing of a display image, image processing for detection tracking, and the like, using a visible light image. Among the components of the image processing unit 105, the image pre-processing unit 114 converts the visible light image to acquire an RGB signal or a YUV signal, and writes the acquired signal into the memory 115. In addition, the image pre-processing unit 114 writes the invisible light image into the memory 115. As the memory 115, a dynamic random access memory (DRAM), a static random access memory (SRAM), or the like is used.

The object detection unit 116 detects one or more subjects from the RGB signal or the YUV signal for each frame. Furthermore, the object detection unit 116 (detection unit) acquires, as detection results, for the detected one or more subjects, number information indicating how many subjects have been detected, size information indicating the size of the subject, center position information indicating the center position of the subject, area information indicating the area of the subject, and the like. The object identification unit 117 (identification unit) identifies the subject detected by the object detection unit 116 to acquire, as an identification result, class information indicating the type of the identified subject. It should be noted that the object identification unit 117 also has an authentication function to be described later.

The object detection unit 116 and the object identification unit 117 are implemented by, for example, an identifier using machine learning such as random forest or neural network. The identifier is capable of detecting one or more subjects by training in advance using the training data. Furthermore, by training in advance using the training data, the identifier is capable of acquiring the above-described number information, class information, and the like for the detected one or more subjects, such as how many people are included and how many cats are included, for example. Further, the identifier may also acquire, for the detected one or more subjects, a reliability score or the like in addition to the size information, center position information, and area information described above.

In this manner, the object detection unit 116 and the object identification unit 117 is able to quickly perform processing based on the visible light image by using machine learning even in a scene where the visible light image is complicated. It should be noted that the object detection unit 116 and the object identification unit 117 may be configured by one element (detection and identification unit) that has both functions of the object detection unit 116 and the object identification unit 117. This variation is able to reduce the number of components of the image processing unit 105 as compared with the first embodiment. On the other hand, in the first embodiment, since the object detection unit 116 and the object identification unit 117 are configured separately from each other, the processing load is reduced and the processing speed is improved as compared with the above-described variation that has functions of the object detection unit 116 and the object identification unit 117.

The tracking unit 118 (tracking unit) tracks the subject by inferring which position the subject detected by the object detection unit 116 has moved to. Then, the object detection unit 116 acquires, as a result of tracking the subject, center position information and size information of the subject (hereinafter, referred to as a "tracking target subject"). The tracking unit 118 is implemented by using, for example, deep learning (DL) using machine learning, template matching not using machine learning, or the like. It should be noted that the technique to perform the tracking processing by the tracking unit 118 is not limited to the example described above, and an existing technique can be used. For example, the image post-processing unit 119 converts the RGB signal or the YUV signal recorded on the memory 115 into a display image to be displayed on the display unit 106, and outputs the display image obtained by the conversion to the display frame superimposing unit 123. Further, the image post-processing unit 119 converts the RGB signal or the YUV signal recorded on the memory 115 into a recording image to be written in the recording medium 107, and outputs the recording image obtained by the conversion to the recording unit 122. It should be noted that as the recording medium 107, for example, a flash memory such as an SD memory card, a CompactFlash (registered trademark), or the like is used. In addition, examples of the recording image include compressed data obtained by JPEG compression being applied.

The temperature recording determination unit 120 (recording determination unit) determines whether or not to record temperature information indicating the temperature of the subject. This determination will be described below in detail. The temperature acquisition unit 121 (acquisition and recording unit), from the area of the subject of which the temperature information is determined by the temperature recording determination unit 120 to be recorded (hereinafter, it may be referred to as a "recording target subject") in the invisible light image, acquires the temperature information of the recording target subject. This acquisition is performed on the bases of the center position information and the area information included in the detection result of the recording target subject. It should be noted that the temperature information may be acquired as a thermal image or a temperature distribution map, or may be acquired as Exif information.

The recording unit 122 (acquisition and recording unit) writes the temperature information acquired by the temperature acquisition unit 121 into the recording medium 107 in association with the detection result and the identification result of the recording target subject. As a result, in the recording medium 107, the temperature information of the subject is recorded in association with at least the center position information and the area information (that is, the above-mentioned image information) included in the detection result of the subject. Therefore, the temperature information of the subject recorded on the recording medium 107 can be used in the thermal sensation presentation apparatus together with the center position information and the area information of the subject recorded on the recording medium 107 in association with the temperature information of the subject.

The display frame superimposing unit 123 generates a selection frame based on (from) the center position and the size of the subject detected by the object detection unit 116, and outputs a display image obtained by superimposing the generated selection frame on the subject to the display unit 106. Such generation and superimposition of the selection frame is performed on the basis of the center position information and the size information of the subject detected by the object detection unit 116. The selection frame will be described later. In addition, the display frame superimposing unit 123 generates a tracking frame from the center position and size of the tracking target subject, and outputs a display image obtained by superimposing the generated tracking frame on the tracking target subject to the display unit 106. Such generation and superimposition of the tracking frame are performed on the basis of the center position information and the size information of the tracking target subject. Furthermore, the display frame superimposing unit 123 generates a temperature recording frame from the center position and size of the recording target subject, and outputs a display image obtained by superimposing the generated temperature recording frame on the recording target subject to the display unit 106. Such generation and superimposition of the temperature recording frame are performed on the basis of the center position information and the size information of the recording target subject.

The display unit 106 is configured of, for example, an LCD panel, an organic EL panel, or the like, and displays the display image output by the display frame superimposing unit 123. In addition, the display unit 106 displays an image recorded in the system memory 113 (described later) and an image recorded in the recording unit 122. The display unit 106 also displays an operation user interface for receiving an instruction from the user. Furthermore, the display unit 106 may include a plurality of display devices such as an electronic viewfinder (EVF) and a rear monitor provided on the photographer side (rear surface of the image pickup apparatus 100). The display unit 106 may be configured to be capable of simultaneous output (image display) to the plurality of display devices, or may be configured to display an image by selectively switching display devices to be output.

Figure 2A:
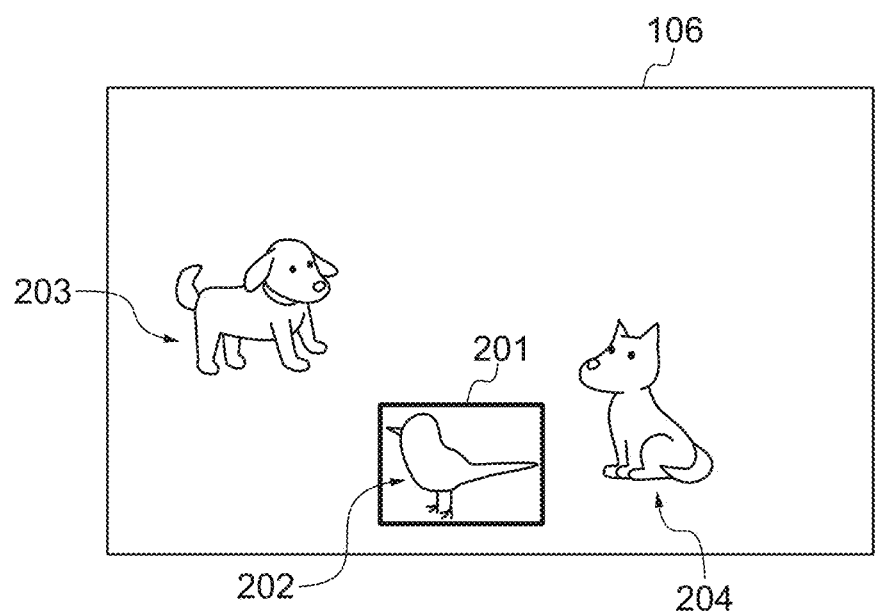
FIG. 2A is a diagram showing a display unit displaying a display image on which a temperature recording frame is superimposed.

FIG. 2A is a diagram showing the display unit 106 displaying a display image on which a temperature recording frame 201 (first display information) having a square frame shape is superimposed. In the case of FIG. 2A, among the three subjects 202 to 204 displayed in the display image on the display unit 106, the subject 202 is a recording target subject. Therefore, the display frame superimposing unit 123 (first display control unit) generates the temperature recording frame 201 based on the detection result and the identification result of the subject 202, and outputs the display image in which the generated temperature recording frame 201 is superimposed on the vicinity of the subject 202 to the display unit 106. By displaying the temperature recording frame 201 in this manner, the user can visually recognize that the subject 202 is a recording target subject, that is, that the subject 202 is a subject of which temperature information is recorded on the recording medium 107 by the recording unit 122. In this manner, the subject 202 as the recording target subject is highlighted by the temperature recording frame 201, and therefore the visibility of the user is improved.

Figure 2B:
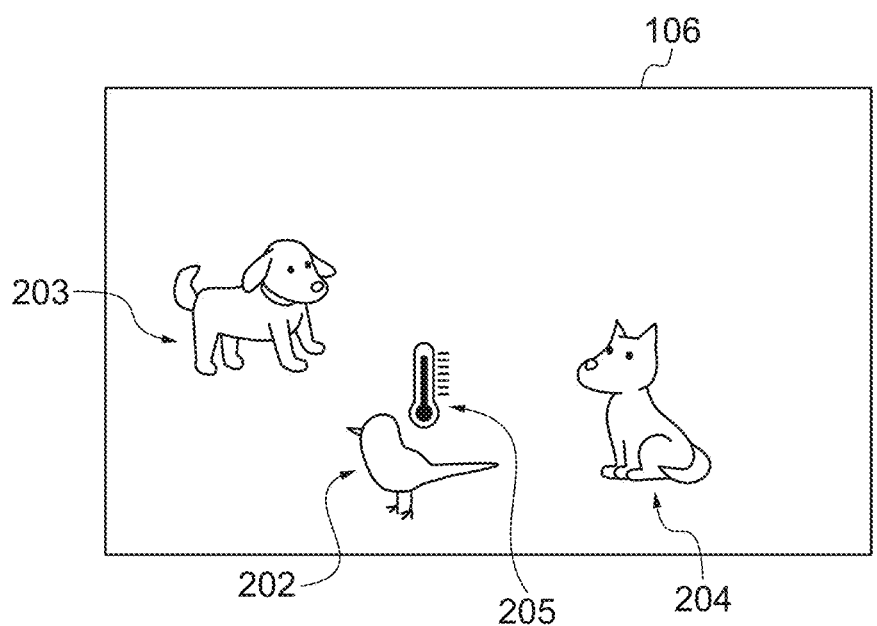
FIG. 2B is a diagram showing the display unit displaying a display image on which a temperature recording icon is superimposed.

FIG. 2B is a diagram showing the display unit 106 displaying a display image on which a temperature recording icon 205 (first display information) is superimposed. The temperature recording icon 205 is an icon representing the glass thermometer with a simple design. In the case of FIG. 2B, similarly to the case of FIG. 2A, among the three subjects 202 to 204 displayed in the display image on the display unit 106, the subject 202 is a recording target subject. Therefore, the display frame superimposing unit 123 (first display control unit) generates the temperature recording icon 205 based on the detection result and the identification result of the subject 202, and outputs the display image in which the generated temperature recording icon 205 is superimposed on the vicinity of the subject 202 to the display unit 106. By displaying the temperature recording icon 205 in this manner, the user can visually recognize that the subject 202 is a recording target subject, that is, that the subject 202 is a subject of which temperature information is recorded on the recording medium 107 by the recording unit 122. In this manner, the subject 202 as the recording target subject is highlighted by the temperature recording icon 205, and therefore the visibility of the user is improved.

It should be noted that means to highlight the recording target subject is not limited to the temperature recording frame 201 and the temperature recording icon 205. For example, the recording target subject may be highlighted by characters, symbols, other simple figures and patterns, effect processing, or the like. The similar manner applies to the selection frame and the tracking frame described above.

FIG. 1 is referred to again. The system control unit 108 controls the entire image pickup apparatus 100. The system control unit 108 implements various processes by executing a program recorded on the nonvolatile memory 112. The release button 109, the mode selection switch 110, and the operation unit 111 input various operation instructions into the system control unit 108 in accordance with a user's operation. The release button 109 inputs an operation instruction to the system control unit 108 while distinguishing between a state in which the release button 109 is in the process of being operated, the so-called "half-press" (shooting preparation instruction) and a state in which the release button 109 is completely operated, the so-called "full-press" (shooting instruction).

When a shooting preparation instruction is input by the "half-press" described above, the system control unit 108 controls the entire system (image pickup apparatus 100) to start operations such as autofocus (AF) processing, automatic exposure (AE) processing, and/or automatic white balance (AWB) processing. Furthermore, when a shooting instruction is input by the above-described "full-press", the system control unit 108 controls the entire system (image pickup apparatus 100) to start a series of operations of image pickup processing from signal reading from the visible light image pickup device 103 and/or the invisible light image pickup device 104 to writing a recording image into the recording medium 107.

The mode selection switch 110 switches the operation mode of the system control unit 108 to any mode out of a still image recording mode, a moving image shooting mode, a play mode, and the like. In each of the still image recording mode and the moving image shooting mode, the shutter speed of the shutter 102 can be set by shutter speed setting. Each of the still image recording mode and the moving image shooting mode has a temperature recording setting mode. In the temperature recording setting mode, ON/OFF of the recording of the temperature information can be switched, and the subject of which temperature information is to be recorded can be switched by the priority type setting or the subject authentication setting. The user can switch the operation mode of the system control unit 108 to any mode among these modes included in the menu by operating the mode selection switch 110.

The operation unit 111 includes a plurality of operation members. Each operation member allows the user to select/operate various function icons and the like displayed on the display unit 106. In addition, the user can intuitively perform various settings by operating hardware such as various function buttons and/or key sticks in four directions of up, down, left, and right. That is, the user can perform a touch operation, a button operation, a key operation, and a stick operation by using each operation member of the operation unit 111. The nonvolatile memory 112 is an electrically erasable and recordable memory. The nonvolatile memory 112 is, for example, an EEPROM or the like, and stores constants, programs, and the like for operation of the system control unit 108.

A RAM is used as the system memory 113, in which constants and variables, the program read from the nonvolatile memory 112, and the like, for operation of the system control unit 108 are loaded. In addition, the system memory 113 is used for temporary recording of data generated or the like by the operation of each block included in the image pickup apparatus 100.

Figure 3:
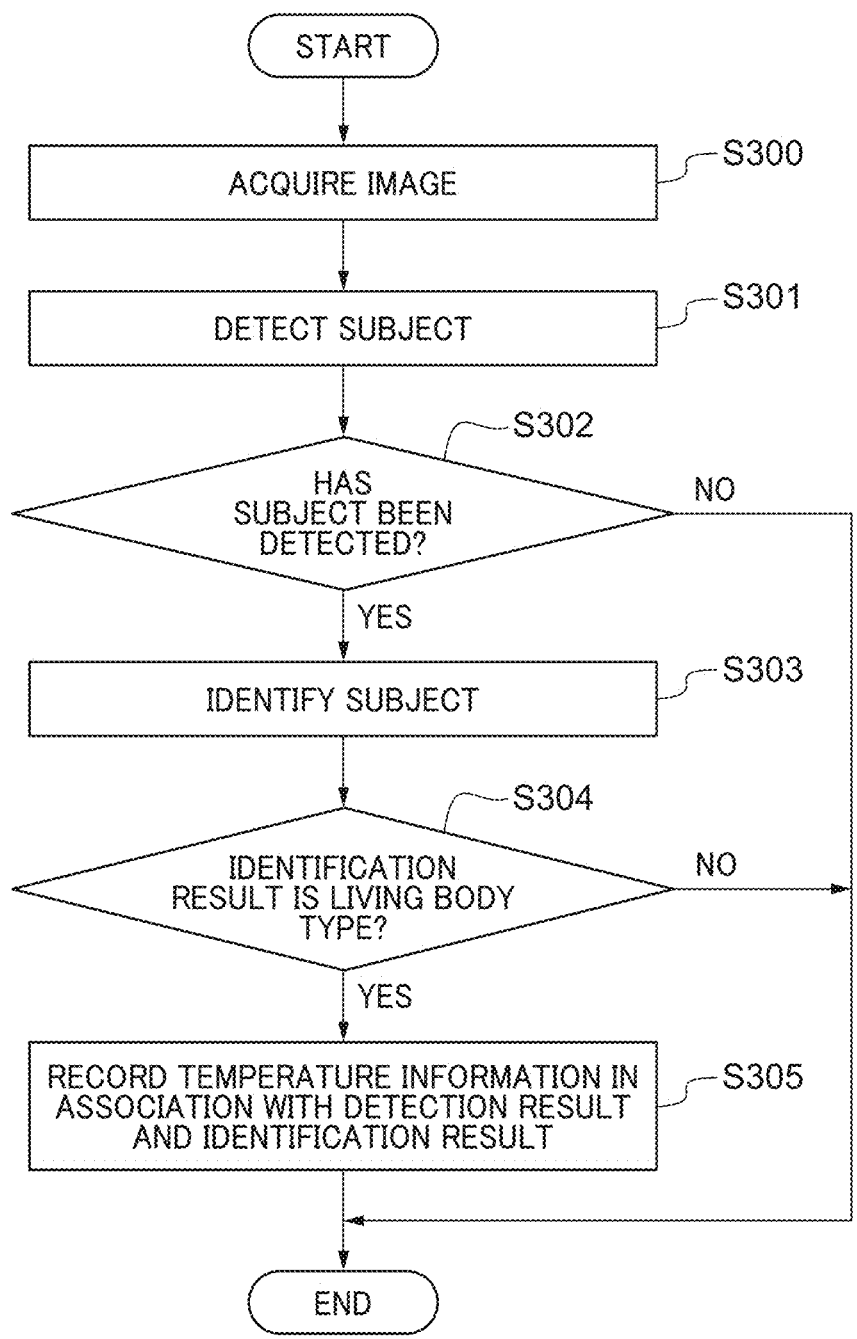
FIG. 3 is a flowchart showing temperature recording control according to the first embodiment.

Next, details of the temperature recording control in the first embodiment will be described. FIG. 3 is a flowchart showing temperature recording control according to the first embodiment. Each of the processes shown in the flowchart in FIG. 3 (control method of the image pickup apparatus) is implemented by the system control unit 108 (computer) reading the program stored in the nonvolatile memory 112 into the system memory 113 and executing the read program to control each component of the image processing unit 105. In addition, the flowchart of FIG. 3 is started in a case where the operation mode of the system control unit 108 is set to the temperature recording setting mode and the recording of the temperature information is ON. The similar manner applies to the flowcharts showing the temperature recording control in second, third, and fourth embodiments to be described later.

In the temperature recording control in the first embodiment, temperature information is recorded on the basis of the detection result by the object detection unit 116 and the identification result by the object identification unit 117. FIG. 4 is a diagram showing a table in which a detection result by the object detection unit 116, an identification result by the object identification unit 117, and a determination result by the temperature recording determination unit 120 are associated with five scenes assumed in the first embodiment. In the "detection result" in the table of FIG. 4, "x" indicates that the object detection unit 116 could not detect the subject, and "o" indicates that the object detection unit 116 could detect the subject. In the "identification result" in the table of FIG. 4, "none" indicates that the type of the subject detected by the object detection unit 116 cannot be identified by the object identification unit 117. Furthermore, in the "identification result", "person", "motorcycle", and "dog" indicate that the object identification unit 117 has identified the type of the subject detected by the object detection unit 116 as a person, a motorcycle, and a dog, respectively.

In the "determination result" in the table of FIG. 4, "x" indicates that the temperature recording determination unit 120 determines not to record the temperature information of the subject, and "o" indicates that the temperature recording determination unit 120 determines to record the temperature information of the subject. In the first embodiment, in a case where the type of the subject is the type of the living body, the temperature recording determination unit 120 determines to record the temperature information of the subject.

According to the table of FIG. 4, in Scenes 3 and 5, the types of subjects are a person and a dog, respectively. Therefore, in this case, the temperature recording determination unit 120 determines to record the temperature information of the subject, and therefore, the determination results of Scenes 3 and 5 are "o". It should be noted that the type of the living body is not limited to the "person" and the "dog" indicated in the table of FIG. 4, and includes living bodies other than the person and the dog (e.g., cat, bird, etc.). In addition, the "type of living body" may include a part of the living body such as a "head" or a "torso".

On the other hand, the temperature recording determination unit 120 determines not to record the temperature information of the subject in a case where the type cannot be identified by the object identification unit 117 or in a case where the type of the subject is the type of the non-living body. According to the table of FIG. 4, the type cannot be identified by the object identification unit 117 in Scene 2. Therefore, in this case, the temperature recording determination unit 120 determines not to record the temperature information of the subject, and therefore, the determination result of Scene 2 is "x" In addition, in Scene 4, the type of the subject is a motorcycle. Therefore, in this case, the temperature recording determination unit 120 determines not to record the temperature information of the subject, and therefore, the determination result of Scene 4 is "x". It should be noted that the type of the non-living body is not limited to the "motorcycle" indicated in the table of FIG. 4, and may include vehicles other than motorcycles (e.g., bicycles, cars, railways, airplanes, ships, etc.). It should be noted that in a case where the object detection unit 116 cannot detect the subject (Scene 1), neither identification by the object identification unit 117 nor determination by the temperature recording determination unit 120 is performed.

The temperature recording control in the first embodiment will be described with reference to the flowchart of FIG. 3. In step S300, the visible light image pickup device 103 acquires a visible light image (first image pickup). Further, the image pre-processing unit 114 converts the acquired visible light image into an RGB signal or a YUV signal, and writes the RGB signal or the YUV signal into the memory 115. Furthermore, the invisible light image pickup device 104 acquires an invisible light image (second image pickup). In addition, the image pre-processing unit 114 writes the acquired invisible light image into the memory 115.

In step S301, the object detection unit 116 detects one or more subjects from the RGB signal or the YUV signal recorded on the memory 115. Furthermore, in a case where one or more subjects are detected, the object detection unit 116 acquires the above-described number information, size information, center position information, area information, and the like as detection results, for the detected one or more subjects (detection step). In step S302, the system control unit 108 determines whether or not a subject is detected by the object detection unit 116. In a case where the system control unit 108 determines that the object detection unit 116 has detected the subject, the process proceeds to step S303. On the other hand, in a case where the system control unit 108 determines that no subject is detected by the object detection unit 116, the temperature recording control of FIG. 3 ends.

In step S303, the object identification unit 117 identifies the subject detected by the object detection unit 116 to acquire the above-described class information as an identification result (identification step). In step S304, the temperature recording determination unit 120 determines whether or not to record the temperature information of the subject on the basis of the identification result of the subject, for the subject detected by the object detection unit 116 (recording determination step). Specifically, in a case where the type according to the identification result by the object identification unit 117 is the type of a living body such as a person or a dog, the temperature recording determination unit 120 determines to record the temperature information of the subject. Thereafter, the process proceeds to step S305. On the other hand, in a case where the type according to the identification result by the object identification unit 117 is the type of a non-living body such as a motorcycle or in a case where the subject could not be identified by the object identification unit 117, the temperature recording determination unit 120 determines not to record the temperature information of the subject detected by the object detection unit 116. In a case where the temperature recording determination unit 120 determines not to record the temperature information of the subject, the temperature recording control of FIG. 3 ends.

In step S305, the temperature acquisition unit 121 acquires temperature information of a subject that is a target of determination by the temperature recording determination unit 120 in step S304 and is determined to record temperature information thereof, that is, acquires temperature information of a recording target subject. Furthermore, the recording unit 122 writes the temperature information of the recording target subject acquired by the temperature acquisition unit 121 into the recording medium 107 in association with the detection result and the identification result of the recording target subject (acquisition and recording step). Thereafter, the temperature recording control of FIG. 3 ends. It should be noted that, in a case where the object detection unit 116 detects a plurality of subjects, steps S303 to S305 are performed for each of the subjects detected by the object detection unit 116.

As described above, the image pickup apparatus 100 according to the first embodiment records the temperature information of the subject on the recording medium 107 according to a determination based on the detection result by the object detection unit 116 and the identification result by the object identification unit 117. As a result, the image pickup apparatus 100 can record the temperature information of the subject appropriately narrowed down as the target. Furthermore, the thermal sensation presentation apparatus can limit a subject to be presented with thermal sensation to a living body or the like without performing high-specification post-processing such as detection necessary for limiting the subject, by using temperature information or the like recorded on the recording medium 107 of the image pickup apparatus 100.

It should be noted that the present invention is not limited to the first embodiment, and various modifications and changes can be made within the scope of the gist of the present invention. For example, unlike the first embodiment, the image pickup apparatus 100 may determine not to record the temperature information of the subject in a case where the type of the subject is identified as the type of the living body, and determine to record the temperature information of the subject in a case where the type of the subject is identified as the type of the non-living body. Furthermore, the image pickup apparatus 100 may determine whether or not to record the temperature information of the subject according to another type different from the living body/non-living body.

Figure 5:
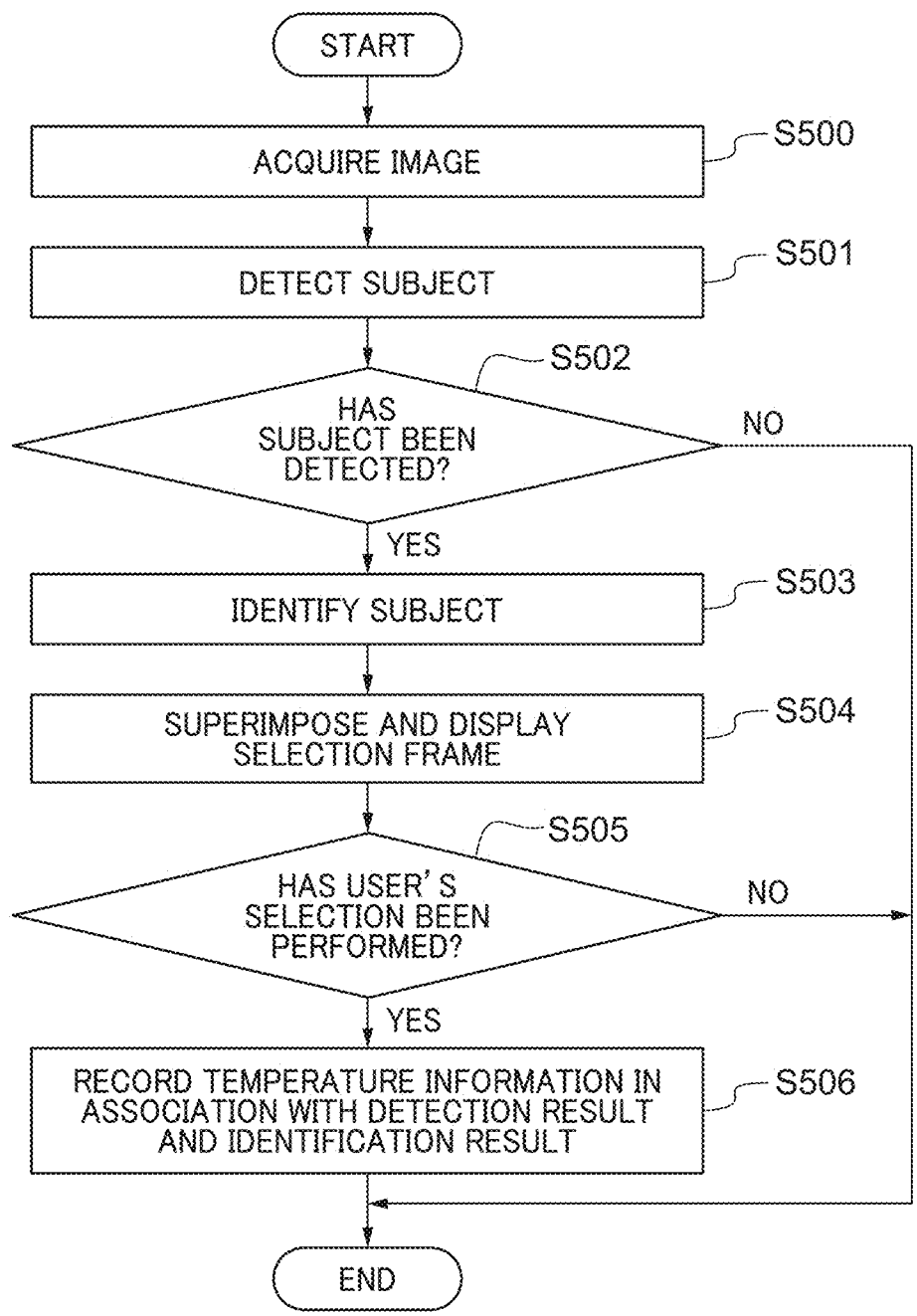
FIG. 5 is a flowchart showing temperature recording control according to a second embodiment.

Hereinafter, a second embodiment will be described with reference to FIGS. 5 and 6. Here, portions different from those of the first embodiment will be mainly described. FIG.

5 is a flowchart showing temperature recording control according to the second embodiment. In the temperature recording control in the second embodiment, temperature information is recorded on the basis of selection by the user in addition to the detection result by the object detection unit 116 and the identification result by the object identification unit 117. Hereinafter, the temperature recording control in the second embodiment will be described with reference to the flowchart of FIG. 5. Since steps S500 to S503 are similar to steps S300 to S303 described above, the descriptions thereof are omitted.

In step S504, for subject detected by the object detection unit 116, the display frame superimposing unit 123 generates a selection frame based on the center position and the size of the subject, and outputs a display image obtained by superimposing the generated selection frame on the vicinity of the subject to the display unit 106. As a result, the display image in which the selection frame is superimposed on the vicinity of the subject is displayed on the display unit 106. However, the display frame superimposing unit 123 (second display control unit) generates and superimposes the selection frame (second display information) only for the subject of which identification result (type of "identification result") by the object identification unit 117 in step S503 is the type of living body such as a person or a dog. It should be noted that, in a case where the object detection unit 116 detects a plurality of subjects, steps S503 and S504 are performed for each of the subjects detected by the object detection unit 116.

Figure 6:
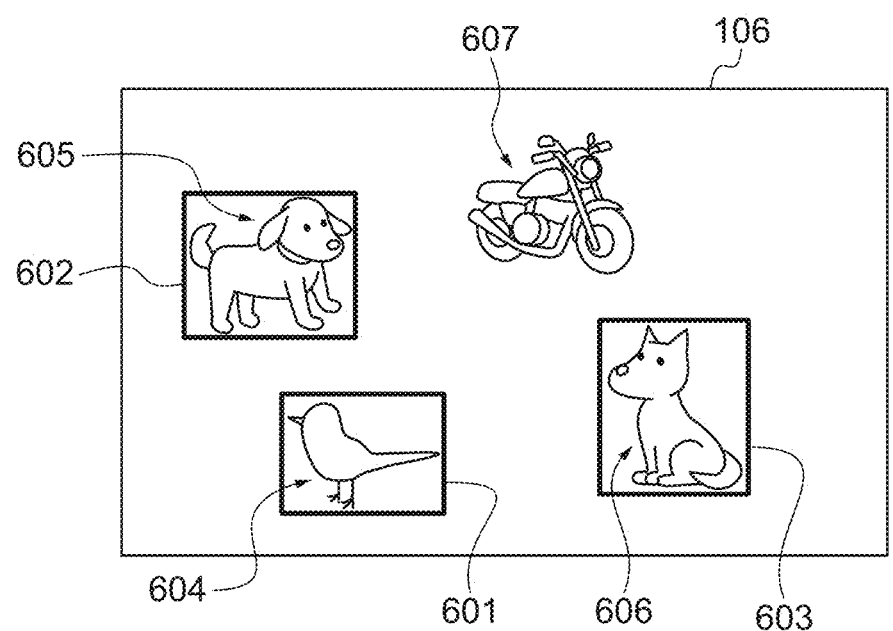
FIG. 6 is a diagram showing a display unit displaying a display image on which selection frames are superimposed.

FIG. 6 is a diagram showing the display unit 106 displaying a display image on which selection frames 601 to 603 are superimposed. In the case of FIG. 6, four subjects 604 to 607 are displayed in the display image on the display unit 106. The type of the subject 604 is a "bird", which is a type of a living body. The type of each of the subjects 605 and 606 is a "dog", which is a type of a living body. The type of the subject 607 is a "motorcycle", which is a type of a non-living body. Therefore, the display frame superimposing unit 123 generates the selection frames 601 to 603 on the basis of the detection result and the identification result of the subjects 604 to 607, and outputs the display image in which the generated selection frames 601 to 603 are superimposed on the vicinity of the subjects 604 to 606 to the display unit 106.

FIG. 5 is referred to again. In step S505, for each subject on which the selection frame is superimposed in the display image displayed on the display unit 106, the temperature recording determination unit 120 determines whether or not to record the temperature information of the subject on the basis of the selection by the user. In a case where the user selects (operates) the subject on which the selection frame is superimposed in the display image displayed on the display unit 106, the temperature recording determination unit 120 determines to record the temperature information of the selected subject. Thereafter, the process proceeds to step S506. On the other hand, in a case where the user does not select (operates) the subject on which the selection frame is superimposed in the display image displayed on the display unit 106, the temperature recording determination unit 120 determines not to record the temperature information of the not-selected subject, and the temperature recording control in FIG. 5 ends.

When the user performs a touch operation, a button operation, a key operation, or a stick operation using the operation unit 111, a subject is selected. In addition, the system control unit 108 enables the user to select the subject on which the selection frame is superimposed, and disables the user to select the subject on which the selection frame is not superimposed, in the display image displayed on the display unit 106.

Specifically, in the display image on the display unit 106 shown in FIG. 6, the user can select the subjects 604 to 606 on which the selection frames 601 to 603 are superimposed, and the user cannot select the subject 607 on which the selection frame is not superimposed. Then, in a case where the user selects at least one of the subjects 604 to 606 on which the selection frames 601 to 603 are superimposed, the temperature recording determination unit 120 determines to record the temperature information of the selected subject. Since the selection frames 601 to 603 are superimposed and displayed in the vicinity of the selectable subjects 604 to 606, the user can visually recognize that the subjects 604 to 606 can be selected on the operation unit 111 when selecting the subject. That is, the subjects 604 to 606 that can be selected by the user on the operation unit 111 are highlighted by the selection frames 601 to 603, and therefore, the visibility of the user is improved.

FIG. 5 is referred to again. Since step S506 is similar to step S305 described above, the description thereof will be omitted. After step S506, the temperature recording control in FIG. 5 ends. It should be noted that, in a case where the user selects a plurality of subjects on the operation unit 111, step S506 is performed for each of the subjects selected by the user.

As described above, in the image pickup apparatus 100 according to the second embodiment, the user can select a subject of which temperature information is desired to be recorded on the recording medium 107 from among one or more subjects displayed in the display image on the display unit 106. Note that the image pickup apparatus 100 restricts the subject selectable by the user by the type of the subject on the basis of the identification result of the object identification unit 117. In this manner, the image pickup apparatus 100 records the temperature information of the subject on the recording medium 107 according to the determination based on the selection by the user in addition to the detection result by the object detection unit 116 and the identification result by the object identification unit 117. As a result, the image pickup apparatus 100 can record the temperature information on the subject appropriately narrowed down as the target. Furthermore, the thermal sensation presentation apparatus can limit the subject to be presented with thermal sensation to a subject selected by the user via the image pickup apparatus 100, by using the temperature information or the like recorded on the recording medium 107 of the image pickup apparatus 100 without performing high-specification post-processing necessary for limiting the subject.

It should be noted that the present invention is not limited to the second embodiment, and various modifications and changes can be made within the scope of the gist of the present invention. For example, unlike the second embodiment, the image pickup apparatus 100 may be configured so that the user can select any subject from among one or more subjects displayed in the display image on the display unit 106. In this case, neither the identification result by the object identification unit 117 nor the generation and superimposition of the selection frame by the display frame superimposing unit 123 is necessary. Furthermore, the image pickup apparatus 100 may be configured so that the user can select an area in which the temperature information is desired to be recorded on the recording medium 107 in the display image displayed on the display unit 106. In this case, the image pickup apparatus 100 records the temperature information of the area selected by the user, the information for specifying the area, and the like on the recording medium 107 in association with each other. As a result, by the area to be targeted being selected by the user the image pickup apparatus 100 can record the temperature information of the area on which the detection by the object detection unit 116 is not performed and/or the temperature information of the area on which the identification by the object identification unit 117 is not performed as well, on the recording medium 107.

Figure 7:
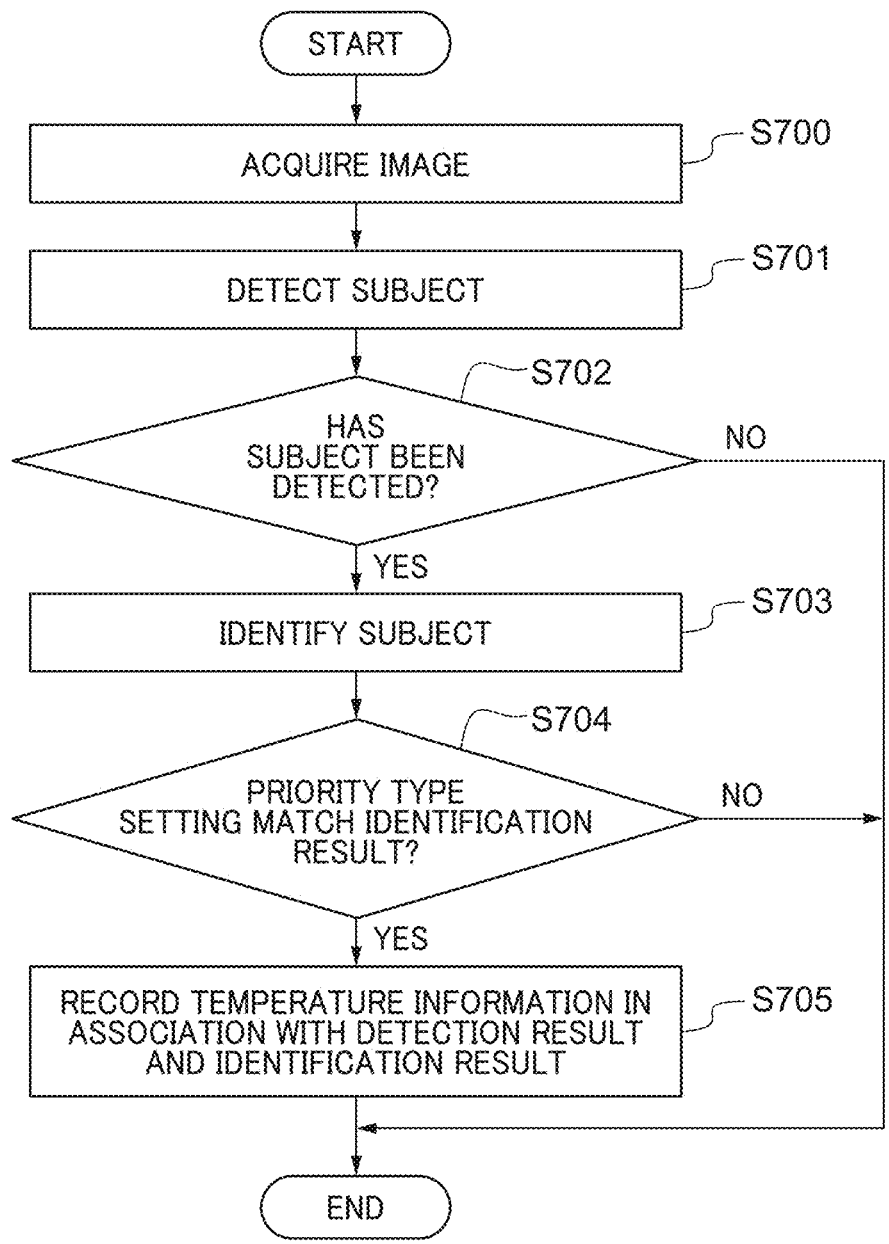
FIG. 7 is a flowchart showing temperature recording control according to a third embodiment.

Hereinafter, a third embodiment will be described with reference to FIGS. 7 and 8. Here, portions different from those of the first embodiment will be mainly described. FIG. 7 is a flowchart showing temperature recording control according to the third embodiment. In the temperature recording control in the third embodiment, temperature information is recorded on the basis of the priority type setting in addition to the detection result by the object detection unit 116 and the identification result by the object identification unit 117. It should be noted that the priority type setting is performed by the user performing a touch operation, a button operation, a key operation, or a stick operation using the operation unit 111. The switching (change) of the priority type setting may be performed in advance or may be performed at any time.

Figure 8:
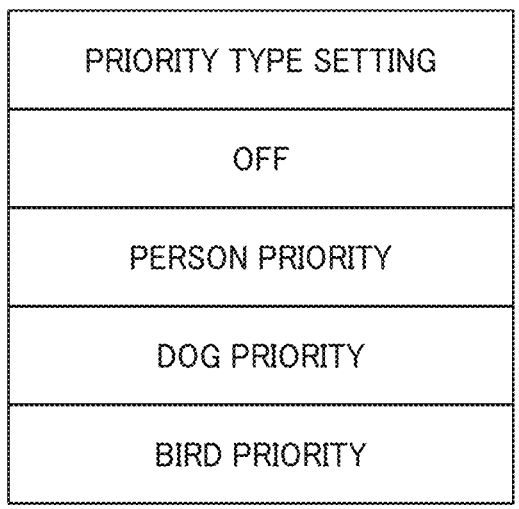
FIG. 8 is a diagram showing a list of priority type settings assumed in the third embodiment.

FIG. 8 is a diagram showing a list of priority type settings assumed in the third embodiment. In the list of FIG. 8, "OFF" indicates that the priority type setting is not performed, "person priority" indicates that the type of the subject for which the priority type is set is the person, "dog priority" indicates that the type of the subject for which the priority type is set is the dog, and "bird priority" indicates that the type of the subject for which the priority type is set is the bird. It should be noted that the type of the subject for which the priority type is set is not limited to the person, the dog, and the bird indicated in the list of FIG. 8, and includes the type of living body other than the person, the dog, and the bird. In addition, the type of the subject to be set as the priority type may include a part of a living body such as a "head" or a "torso", or may include a type of a non-living body such as a "car" or a "motorcycle".

Hereinafter, the temperature recording control in the third embodiment will be described with reference to the flowchart of FIG. 7. Since steps S700 to S703 are similar to steps S300 to S303 described above, the descriptions thereof are omitted. In step S704, the temperature recording determination unit 120 determines, for the subject detected by the object detection unit 116, whether to or not record the temperature information of the subject on the basis of the identification result of the subject and the priority type setting performed in advance or at any time. In a case where the type of the identification result by the object identification unit 117 matches the type of the subject for which the priority type is set, the temperature recording determination unit 120 determines to record the temperature information of the subject detected by the object detection unit 116, and the process proceeds to step S705.

On the other hand, in a case where the type of the identification result by the object identification unit 117 does not match the type of the subject for which the priority type is set, or in a case where the type of the subject detected by the object detection unit 116 cannot be identified by the object identification unit 117, or in a case where the priority type is not set, the temperature recording determination unit 120 determines not to record the temperature information of the subject detected by the object detection unit 116. In a case where the temperature recording determination unit 120 determines not to record the temperature information of the subject, the temperature recording control of FIG. 7 ends. Since step S705 is similar to step S305 described above, the description thereof is omitted. After step S705, the temperature recording control of FIG. 7 ends. It should be noted that, in a case where the object detection unit 116 detects a plurality of subjects, steps S703 to S705 are performed for each of the subjects detected by the object detection unit 116.

As described above, the image pickup apparatus 100 according to the third embodiment records the temperature information of the subject on the recording medium 107 according to the determination based on the priority type setting in addition to the detection result by the object detection unit 116 and the identification result by the object identification unit 117. As a result, the image pickup apparatus 100 can record the temperature information of the subject appropriately narrowed down as the target. Furthermore, the thermal sensation presentation apparatus can limit the subject to be presented with thermal sensation to a subject for which the user has set a priority type in the image pickup apparatus 100, by using the temperature information or the like recorded on the recording medium 107 of the image pickup apparatus 100 without performing high-specification post-processing necessary for limiting the subject. It should be noted that the present invention is not limited to the third embodiment, and various modifications and changes can be made within the scope of the gist of the present invention. For example, unlike the third embodiment, the image pickup apparatus 100 may be configured such that the user can set a plurality of types as priority type.

Figure 9:
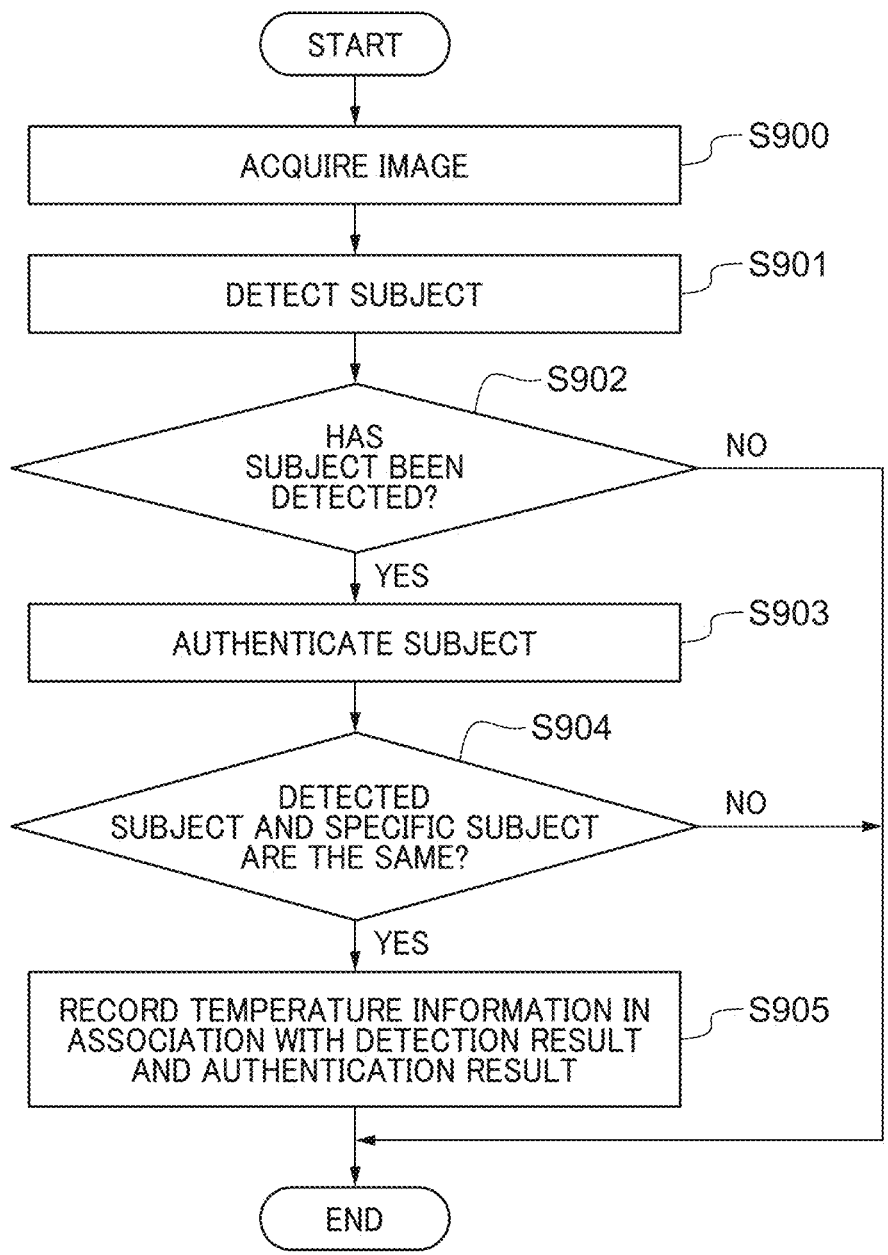
FIG. 9 is a flowchart showing temperature recording control according to a fourth embodiment.

Hereinafter, a fourth embodiment will be described with reference to FIG. 9. Here, differences from the first embodiment will be mainly described. FIG. 9 is a flowchart showing temperature recording control according to the fourth embodiment. In the temperature recording control in the fourth embodiment, temperature information is recorded on the basis of the detection result by the object detection unit 116 and the authentication result by the object identification unit 117. The authentication result by the object identification unit 117 is a result obtained by the object identification unit 117 confirming (determining), using the authentication function, whether or not the subject detected by the object detection unit 116 and a specific subject registered in advance are the same. In this manner, the object identification unit 117 acquires the authentication result as the above-described identification result. The user can register the specific subject in advance by performing subject authentication setting (authentication setting). In the subject authentication setting, for example, a specific person, a specific pet, or the like is registered in advance as a specific subject. It should be noted that the subject authentication setting is performed by the user performing a touch operation, a button operation, a key operation, and/or a stick operation using the operation unit 111.

Hereinafter, the temperature recording control in the fourth embodiment will be described with reference to the flowchart of FIG. 9. Since steps S900 to S902 are similar to steps S300 to S302 described above, the descriptions thereof are omitted. In step S903, the object identification unit 117 acquires an authentication result of the subject detected by the object detection unit 116. In step S904, the temperature recording determination unit 120 determines whether or not to record the temperature information of the subject on the basis of the acquired authentication result, for the subject detected by the object detection unit 116.

In a case where the authentication result by the object identification unit 117 is "The subject detected by the object detection unit 116 and the specific subject registered in advance in the subject authentication setting are the same.", the temperature recording determination unit 120 determines to record the temperature information of the subject detected by the object detection unit 116, and the process proceeds to step S905. On the other hand, in a case where the authentication result of the object identification unit 117 is not "The subject detected by the object detection unit 116 and the specific subject registered in advance in the subject authentication setting are the same.", the temperature recording determination unit 120 determines not to record the temperature information of the subject detected by the object detection unit 116. In a case where the temperature recording determination unit 120 determines not to record the temperature information of the subject, the temperature recording control of FIG. 9 ends.

In step S905, the temperature acquisition unit 121 acquires temperature information of a subject that is a target of determination by the temperature recording determination unit 120 in step S904 and is determined to record temperature information thereof, that is, acquires temperature information of a recording target subject. Furthermore, the recording unit 122 writes the temperature information of the recording target subject acquired by the temperature acquisition unit 121 into the recording medium 107 in association with the detection result and the authentication result of the recording target subject. Thereafter, the temperature recording control of FIG. 9 ends. It should be noted that, in a case where the object detection unit 116 detects a plurality of subjects, steps S903 to S905 are performed for each of the subjects detected by the object detection unit 116.

As described above, the image pickup apparatus 100 according to the fourth embodiment records the temperature information of the subject on the recording medium 107 according to the determination based on the detection result by the object detection unit 116 and the authentication result that is the identification result by the object identification unit 117. As a result, the image pickup apparatus 100 can record the temperature information of the subject appropriately narrowed down as the target. Furthermore, the thermal sensation presentation apparatus can limit the subject to be presented with thermal sensation to a subject for which the user has set subject authentication in the image pickup apparatus 100, by using the temperature information or the like recorded on the recording medium 107 of the image pickup apparatus 100 without performing high-specification post-processing necessary for limiting the subject. It should be noted that the present invention is not limited to the fourth embodiment, and various modifications and changes can be made within the scope of the gist of the present invention. For example, unlike the fourth embodiment, the image pickup apparatus 100 may be configured such that the user can set subject authentication in real time.

Hereinafter, first to third thermal sensation presentation apparatuses will be described with reference to FIGS. 10 to 12. Each of the thermal sensation presentation apparatuses described herein can present a thermal sensation on the basis of image information and temperature information associated with the image information provided from any of the image pickup apparatuses 100 according to the first to fourth embodiments.

Figure 10:
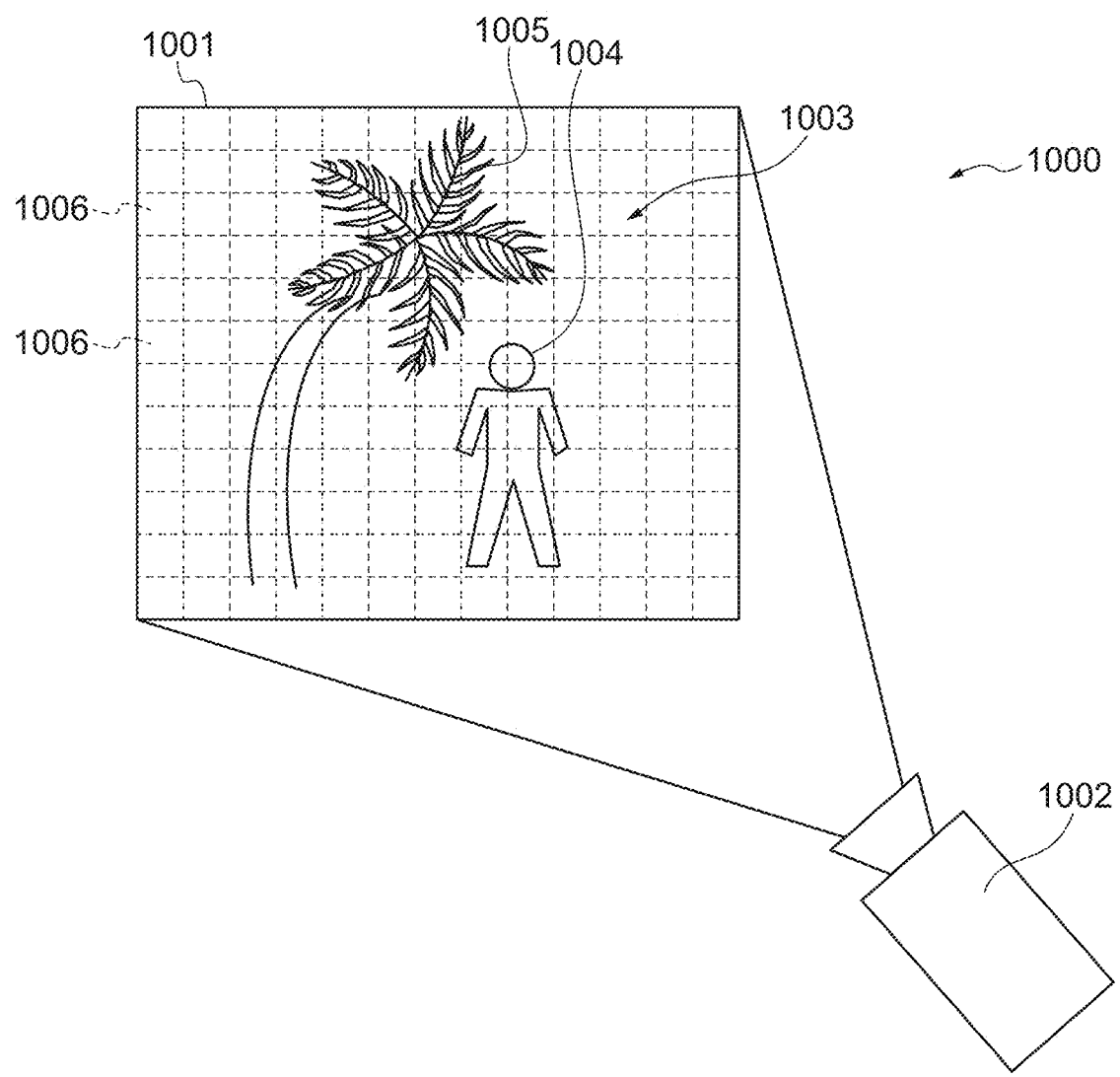
FIG. 10 is a schematic diagram showing a use state of a first thermal sensation presentation apparatus.

FIG. 10 is a schematic diagram showing a use state of a first thermal sensation presentation apparatus 1000. The first thermal sensation presentation apparatus 1000 includes a screen 1001 and a projector 1002 positioned away from the screen 1001. The screen 1001 may be omitted from the configuration of the first thermal sensation presentation apparatus 1000, wherein in this case, the screen 1001 or a screen equivalent thereto is prepared separately from the first thermal sensation presentation apparatus 1000. The projector 1002 irradiates (projects), onto the screen 1001, an image 1003 obtained from the input image data input to first thermal sensation presentation apparatus 1000. Thus, the image 1003 is displayed on the screen 1001. Then, the position of the screen 1001 is adjusted with respect to the irradiation field angle of the projector 1002.

The image 1003 includes a human 1004 and a tree 1005. The screen 1001 has a plurality of Peltier elements 1006 arranged in a matrix on the back side of the screen 1001. By controlling each Peltier element 1006, the temperature of each portion on the screen 1001 can be changed. For example, the portion which overlaps the image of the human 1004 on the screen 1001 (portion to which the human 1004 is projected, on the screen 1001) is determined to be a temperature control target on the basis of the image information and the temperature information acquired from any of the image pickup apparatuses 100 according to the above-described embodiments, and the temperature is adjusted. As a result, the user can feel the temperature corresponding to the human 1004 by touching the portion of the screen 1001 corresponding to the human 1004 while visually recognizing the image of the human 1004 projected on the screen 1001.

Figure 11:
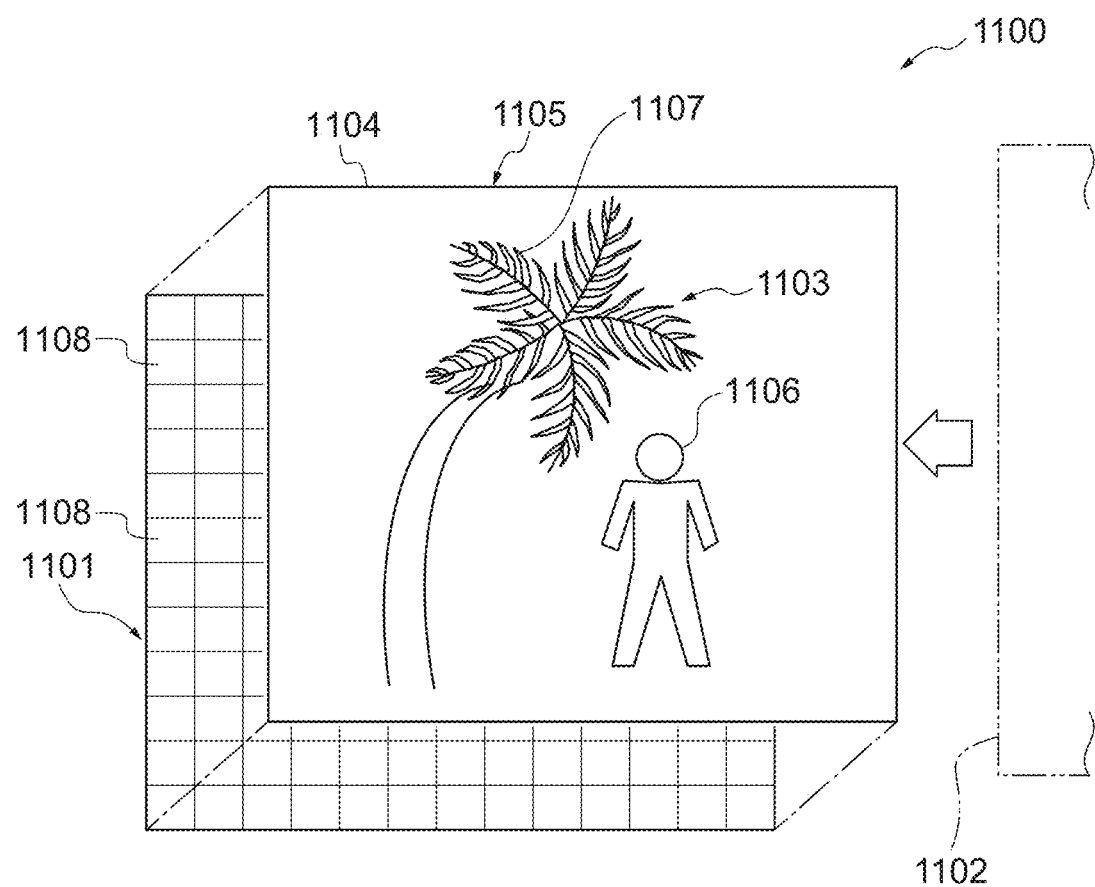
FIG. 11 is a schematic diagram showing a use state of a second thermal sensation presentation apparatus.

FIG. 11 is a schematic diagram showing a use state of a second thermal sensation presentation apparatus 1100. The second thermal sensation presentation apparatus 1100 includes a thermal sensation presentation unit 1101 and a printing unit 1102. It should be noted that the printing unit 1102 may be omitted from the configuration of the second thermal sensation presentation apparatus 1100, wherein in this case, the printing unit 1102 or a printing unit equivalent thereto is prepared separately from the second thermal sensation presentation apparatus 1100. Preferably, the printing unit 1102 is communicably connected to the second thermal sensation presentation apparatus 1100. The printing unit 1102 forms and prints, on a sheet 1104, an image 1103 obtained from the input image data input to the second thermal sensation presentation apparatus 1000, and outputs (prints out) obtained printed matter 1105. Thus, the image 1103 is displayed on the sheet 1104. The image 1103 includes a human 1106 and a tree 1107.

The thermal sensation presentation unit 1101 has a plurality of Peltier elements 1108 arranged in a matrix on the front side of the thermal sensation presentation unit 1101. By controlling each Peltier element 1108, the temperature of each portion of the thermal sensation presentation unit 1101 can be changed. It should be noted that each Peltier element 1108 of the thermal sensation presentation unit 1101 may have a convex shape. The second thermal sensation presentation apparatus 1100 is used by overlapping the printed matter 1105 on the thermal sensation presentation unit 1101. The thermal sensation presentation unit 1101 preferably includes a detection unit configured to detect that the printed matter 1105 is overlapped, and an alignment unit configured to perform alignment with the printed matter 1105. Then, the portion of the thermal sensation presentation unit 1101 overlapping the image of the human 1106 is determined to be a temperature control target on the basis of the image information and the temperature information acquired from any of the image pickup apparatuses 100 according to the above-described embodiments, and the temperature is adjusted. As a result, the user can feel the temperature corresponding to the human 1106 by touching the portion of the printed matter 1105 corresponding to the human 1106 while visually recognizing the image of the human 1106 formed on the printed matter 1105.

Figure 12:
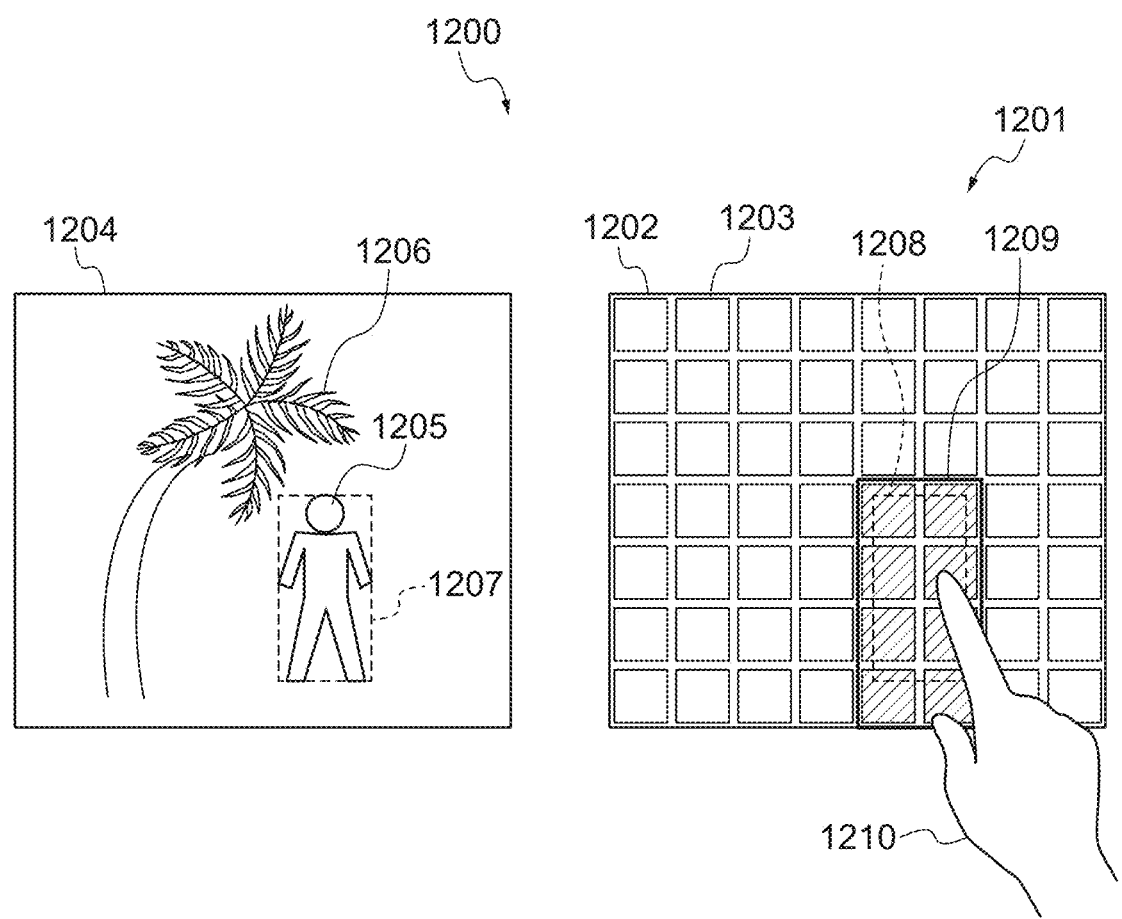
FIG. 12 is a schematic diagram showing a use state of a third thermal sensation presentation apparatus.

FIG. 12 is a schematic diagram showing a use state of a third thermal sensation presentation apparatus 1200. The third thermal sensation presentation apparatus 1200 includes a thermal sensation presentation unit 1201 on the back side of an image display unit such as a liquid crystal screen. The thermal sensation presentation unit 1201 includes a thermal sensation presentation area 1202 that presents thermal sensation. In the thermal sensation presentation area 1202, a plurality of thermal sensation presentation elements 1203 consisting of, for example, Peltier elements are arranged in a matrix (7 rows vertically and 8 columns horizontally, in the configuration shown in FIG. 12). The input image data 1204 input to the image data input unit of the third thermal sensation presentation apparatus 1200 is data of an image including a human 1205 and a tree 1206. The input image data 1204 includes information on a person area 1207 which is rectangular and in which the human 1205 is inscribed. In addition, the thermal sensation presentation unit 1201 can scale the entire angle of view of the input image data 1204 to the thermal sensation presentation area 1202.

At this time, in the thermal sensation presentation area 1202, a person corresponding area 1208 having the similar aspect ratio to the aspect ratio of the person area 1207 is formed at a position corresponding to the person area 1207. Then, a person thermal sensation presentation area 1209 consisting of one or more thermal sensation presentation elements 1203, each of which at least a part overlaps at least a part of the person corresponding area 1208, is set. The person thermal sensation presentation area 1209 corresponds to an object occupied area occupied by an object in the image. Whether or not to execute the temperature control of the person thermal sensation presentation area 1209, that is, whether or not to set the person thermal sensation presentation area 1209 as a target area for temperature control is determined on the basis of the image information and the temperature information acquired from any of the image pickup apparatuses 100 according to the above-described embodiments. In the configuration illustrated in FIG. 12, in a case where the temperature information corresponding to the human 1205 is acquired, the person thermal sensation presentation area 1209 presents the temperature, so that the user can feel the temperature (body temperature) of the human 1205 by touching the portion corresponding to the person thermal sensation presentation area 1209 on the image display unit with the finger 1210.

Although the preferable embodiments of the present invention have been described above, the present invention is not limited to the image pickup apparatus 100 according to each of the above-described embodiments, and various modifications and changes can be made within the scope of the gist of the present invention. For example, the temperature acquisition unit 121 and the recording unit 122 may acquire and average a plurality of pieces of temperature information of the subject that is a target of determination by the temperature recording determination unit 120, that is, a plurality of pieces of temperature information of the recording target subject, and record the averaged temperature information of the recording target subject on the recording medium 107. As a result, the image pickup apparatus 100 can record highly accurate temperature information on the recording medium 107.

Specifically, the temperature acquisition unit 121 acquires a plurality of pieces of temperature information of the recording target subject during the opening time of the shutter 102 (shutter opening time), that is, during the exposure time of the visible light image pickup device 103 and the invisible light image pickup device 104. The temperature acquisition unit 121 acquires more temperature information of the recording target subject as the opening time of the shutter 102 is longer, that is, as the exposure time of the visible light image pickup device 103 and the invisible light image pickup device 104 is longer. That is, the temperature acquisition unit 121 acquires a plurality of pieces of temperature information of the subject that is a target of determination by the temperature recording determination unit 120 according to the shutter speed or the exposure time for the image pickup apparatus 100.

Furthermore, in a case where the opening time of the shutter 102 is relatively short (the shutter speed is fast), that is, in a case where the exposure time of the visible light image pickup device 103 and the invisible light image pickup device 104 is relatively short, the temperature acquisition unit 121 may acquire, for example, the temperature information for a shooting frame and the temperature information for each of the frames before and after the shooting frame. That is, the temperature acquisition unit 121 acquires a plurality of pieces of temperature information of the subject that is a target of determination by the temperature recording determination unit 120 from before to after the opening time of the shutter 102 or from before to after the exposure time of the visible light image pickup device 103 and the invisible light image pickup device 104.

Furthermore, when the tracking unit 118 is able to track the same subject over a plurality of frames, that is, during tracking by the tracking unit 118, the temperature acquisition unit 121 and the recording unit 122 may continuously acquire and average temperature information of the same subject tracked by the tracking unit 118. Furthermore, in a case where the tracking unit 118 loses sight of the tracking target subject during tracking by the tracking unit 118, the temperature acquisition unit 121 may delete temperature information of the tracking target subject that had been continuously acquired before the tracking unit 118 lost sight of the tracking target subject. Thus, the image pickup apparatus 100 can remove temperature information unnecessary for the thermal sensation presentation apparatus, for example.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-104103, filed Jun. 26, 2023, which is hereby incorporated by reference wherein in its entirety.

What is claimed is:

1. An image pickup apparatus comprising:
   a first image sensor configured to acquire a visible light image;
   a second image sensor configured to acquire an invisible light image;
   at least one processor; and
   at least one memory coupled to the at least one processor and storing instructions that, when executed by the at least one processor, cause the at least one processor to function as:
   a detection unit configured to acquire one or more detection results by detecting one or more subjects on a basis of the visible light image;
   an identification unit configured to acquire one or more identification results by identifying, on a basis of the visible light image, types of the one or more subjects detected by the detection unit;
   a recording determination unit configured to perform recording determination for determining whether or not to record temperature information of the subject on a basis of the one or more detection results and the one or more identification results; and
   an acquisition and recording unit configured to, in a case where the recording determination unit determines to record the temperature information of the subject, acquire the temperature information of the subject that is a determination target in the recording determination on a basis of the invisible light image and the one or more detection results, and record the acquired temperature information on a recording medium,
   wherein the acquisition and recording unit acquires and averages a plurality of pieces of temperature information of the subject that is the determination target in the recording determination, according to a shutter speed or an exposure time of the image pickup apparatus, and records the average temperature information of the subject on the recording medium.

2. The image pickup apparatus according to claim 1, wherein the identification unit acquires the one or more identification results by using machine learning.

3. The image pickup apparatus according to claim 1, wherein
   the at least one processor further function as:
   a first display control unit configured to superimpose and display, in a display image displayed on a display unit based on the visible light image, first display information indicating that the subject is a subject for which temperature information is to be recorded on the recording medium by the acquisition and recording unit, on a basis of the one or more detection results and the one or more identification results.

4. The image pickup apparatus according to claim 1, further comprising:
   an input device configured to allow a user to select a subject in a display image displayed on a display unit based on the visible light image, wherein
   the recording determination unit determines whether or not to record the temperature information of the subject on a basis of user's selection via the input device in addition to the one or more detection results and the one or more identification results.

5. The image pickup apparatus according to claim 4, wherein
   the at least one processor further function as:
   a display control unit configured to superimpose and display, in the display image, display information indicating that the subject is a subject that can be selected by the user via the input device, on a basis of the one or more detection results and the one or more identification results.

6. The image pickup apparatus according to claim 1, further comprising:
   an input device configured to allow a user to perform priority type setting for setting a type of a subject for which temperature information is preferentially recorded, wherein
   the recording determination unit determines whether or not to record the temperature information of the subject on a basis of the priority type setting in addition to the one or more detection results and the one or more identification results.

7. The image pickup apparatus according to claim 1, further comprising:
   an input device configured to allow a user to perform authentication setting for registering in advance a subject for which temperature information is to be recorded, wherein
   the identification unit acquires, as the one or more identification results, an authentication result as to whether or not the one or more subjects detected by the detection unit and a subject registered in advance in authentication setting are the same.

8. The image pickup apparatus according to claim 4, wherein a touch operation, a button operation, a key operation, or a stick operation can be performed via the input device.

9. The image pickup apparatus according to claim 1, wherein
   the at least one processor further function as:
   a detection and identification unit that has both a function of the detection unit and a function of the identification unit.

10. The image pickup apparatus according to claim 1, wherein the acquisition and recording unit records, in the recording medium, center position information of a subject and area information of the subject which are included in the one or more detection results, and temperature information acquired from the invisible light image on a basis of the center position information and the area information in association with each other.

11. The image pickup apparatus according to claim 10, wherein the detection unit acquires size information of the subject, the center position information, and the area information as the detection results, by using machine learning.

12. An image pickup apparatus comprising:
a first image sensor configured to acquire a visible light image;
a second image sensor configured to acquire an invisible light image;
at least one processor; and
at least one memory coupled to the at least one processor and storing instructions that, when executed by the at least one processor, cause the at least one processor to function as:
a detection unit configured to acquire one or more detection results by detecting one or more subjects on a basis of the visible light image;
an identification unit configured to acquire one or more identification results by identifying, on a basis of the visible light image, types of the one or more subjects detected by the detection unit;
a recording determination unit configured to perform recording determination for determining whether or not to record temperature information of the subject on a basis of the one or more detection results and the one or more identification results; and
an acquisition and recording unit configured to, in a case where the recording determination unit determines to record the temperature information of the subject, acquire the temperature information of the subject that is a determination target in the recording determination on a basis of the invisible light image and the one or more detection results, and record the acquired temperature information on a recording medium,
wherein the acquisition and recording unit acquires and averages a plurality of pieces of temperature information of the subject that is the determination target in the recording determination from before to after an opening time of a shutter or from before to after an exposure time in the image pickup apparatus, and records the average temperature information of the subject on the recording medium.

13. The image pickup apparatus according to claim 1, wherein
the at least one processor further function as:
a tracking unit configured to track the subject that is the determination target in the recording determination, and
the acquisition and recording unit continuously acquires and averages temperature information of the subject being tracked in the tracking, and records the averaged average temperature information of the subject on the recording medium.

14. The image pickup apparatus according to claim 13, wherein in a case where the tracking unit loses sight of the tracking target subject in the tracking, the acquisition and recording unit deletes the temperature information of the subject to be tracked that has been continuously acquired before the tracking unit loses sight of the subject to be tracked.

15. A control method for an image pickup apparatus comprising:
performing first image pickup of acquiring a visible light image;
performing second image pickup of acquiring an invisible light image;
acquiring one or more detection results by detecting one or more subjects on a basis of the visible light image;
acquiring one or more identification results by identifying, on a basis of the visible light image, types of the detected one or more subjects;
performing a recording determination of determining whether or not to record temperature information of a subject on a basis of the one or more detection results and the one or more identification results;
in a case where in the recording determination, it is determined to record the temperature information of a subject, acquiring the temperature information of the subject that is a determination target in the recording determination on a basis of the invisible light image and the one or more detection results, and recording the acquired temperature information on a recording medium; and
acquiring and averaging a plurality of pieces of temperature information of the subject that is the determination target in the recording determination according to a shutter speed or an exposure time of the image pickup apparatus, and recording the average temperature information of the subject on the recording medium.

16. A non-transitory storage medium storing a computer-executable program for executing a control method for an image pickup apparatus, the control method comprising:
performing first image pickup of acquiring a visible light image;
performing second image pickup of acquiring an invisible light image;
acquiring one or more detection results by detecting one or more subjects on a basis of the visible light image;
acquiring one or more identification results by identifying, on a basis of the visible light image, types of the detected one or more subjects;
performing a recording determination of determining whether or not to record temperature information of a subject on a basis of the one or more detection results and the one or more identification results; and
in a case where in the recording determination, it is determined to record the temperature information of a subject, acquiring the temperature information of the subject that is a determination target in the recording determination on a basis of the invisible light image and the one or more detection results, and recording the acquired temperature information on a recording medium; and
acquiring and averaging a plurality of pieces of temperature information of the subject that is the determination target in the recording determination according to a shutter speed or an exposure time of the image pickup apparatus, and recording the average temperature information of the subject on the recording medium.

17. A control method for an image pickup apparatus comprising:
performing first image pickup of acquiring a visible light image;
performing second image pickup of acquiring an invisible light image;
acquiring one or more detection results by detecting one or more subjects on a basis of the visible light image;
acquiring one or more identification results by identifying, on a basis of the visible light image, types of the detected one or more subjects;
performing a recording determination of determining whether or not to record temperature information of a subject on a basis of the one or more detection results and the one or more identification results;
in a case where in the recording determination, it is determined to record the temperature information of a subject, acquiring the temperature information of the subject that is a determination target in the recording determination on a basis of the invisible light image and the one or more detection results, and recording the acquired temperature information on a recording medium; and acquiring and averaging a plurality of pieces of temperature information of the subject that is the determination target in the recording determination from before to after an opening time of a shutter or from before to after an exposure time in the image pickup apparatus, and recording the average temperature information of the subject on the recording medium.

18. A non-transitory storage medium storing a computer-executable program for executing a control method for an image pickup apparatus, the control method comprising:

performing first image pickup of acquiring a visible light image;

performing second image pickup of acquiring an invisible light image;

acquiring one or more detection results by detecting one or more subjects on a basis of the visible light image;

acquiring one or more identification results by identifying, on a basis of the visible light image, types of the detected one or more subjects;

performing a recording determination of determining whether or not to record temperature information of a subject on a basis of the one or more detection results and the one or more identification results;

in a case where in the recording determination, it is determined to record the temperature information of a subject, acquiring the temperature information of the subject that is a determination target in the recording determination on a basis of the invisible light image and the one or more detection results, and recording the acquired temperature information on a recording medium; and acquiring and averaging a plurality of pieces of temperature information of the subject that is the determination target in the recording determination from before to after an opening time of a shutter or from before to after an exposure time in the image pickup apparatus, and recording the average temperature information of the subject on the recording medium.

* * * * *